United States Patent [19]
Selgin

[11] 3,938,896
[45] Feb. 17, 1976

[54] IMAGE COLORIMETER
[75] Inventor: Paul J. Selgin, Bethel, Conn.
[73] Assignee: Neotec Corporation, Rockville, Md.
[22] Filed: Apr. 4, 1974
[21] Appl. No.: 457,846

[52] U.S. Cl. .............................. 356/179; 356/230
[51] Int. Cl.² ........................................... G01J 3/34
[58] Field of Search .......... 356/179, 195, 178, 230, 356/233, 229, 173, 212

[56] References Cited
UNITED STATES PATENTS

| | | | |
|---|---|---|---|
| 2,034,096 | 3/1936 | Hauser | 356/212 |
| 2,739,246 | 3/1956 | Hunter | 356/212 |
| 3,735,143 | 5/1973 | Langford | 250/226 |

FOREIGN PATENTS OR APPLICATIONS

| | | | |
|---|---|---|---|
| 908,418 | 4/1954 | Germany | 356/173 |

*Primary Examiner*—Robert Segal
*Attorney, Agent, or Firm*—Morris Liss

[57] ABSTRACT

A colorimeter includes an objective for focusing an object image on a first half of a viewing screen. A standard light reference beam is projected onto the second half of the screen. A moving shutter alternately blocks the first half then the second half of the screen. A light detector is responsive to the alternating images on the screen as they pass through color filters. The detector output may provide information of spectral distribution or color deviation of the object, relative to the standard reference.

7 Claims, 4 Drawing Figures

IMAGE COLORIMETER

FIELD OF THE INVENTION

The invention generally relates to colorimeters, and more particularly to a colorimeter for measuring color and spectrum distribution, based on the formation of an optical image of an object prior to measurement.

BRIEF DESCRIPTION OF THE PRIOR ART

The "narrow" definition of color flows from the rules set down by the C. I. E. (International Commission for Illumination) for the measurement of color on flat, uniform, opaque surfaces. It prescribes the "illuminants" which may be used (A, B, C, and variations thereof) and the angles for incident and reflected light, the latter being collected by a photosensor. These angles are normally prescribed at 45 deg. and 0 deg. respectively.

The "broad" definition of color takes into account the fact that color is a subjective sensation. It therefore associates "color" with light input to a particular area of the retina. Such light may come from illuminated objects or light sources. It is broken down into three "stimuli" X Y Z whose value can be derived by integration from the spectrum distribution of the light. This is also true of light collected from reflecting surfaces as in the "narrow" definition, above. Tristimulus functions are involved in the integration.

The "narrow" definition takes in, strictly speaking, only flat, opaque, non-luminous objects or surfaces. There are similar definitions for "transmitted" color of transparent objects illuminated from behind, but these do not widen the scope of the definition very much.

Conventional colorimeters are based on the "narrow" definition, which limits the range of objects that can be measured. However, they can be fitted with an "integrating chamber" which corresponds to another, equally narrow, definition of color. These chambers are so designed that light coming from all parts of the object in all directions is sampled and collected on the photosensor. Use of such devices is somewhat impractical and their light efficiency tends to be low.

All colorimeters compare the object to be measured, or "sample," with a "standard" which may be a tile placed on the instrument, or a built-in part: it may be white and identical for all measurements or it may be slightly different from the sample (in differential measurements). This comparison may be carried out in various ways. It may be "sequential," in which case the standard is placed on the instrument port first and the instrument is "zeroed" on this, or stores the values in a memory. After this, the sample is read. Other instruments automatically replace the standard with the sample periodically, with frequency high enough that comparison is "continuous" for all intents and purposes. In any case, however, the advantage of instrument comparison as against visual comparison, which is still the most popular method, is that the latter cannot tell us how much difference there is, or of what kind (except in a very elementary sense).

BRIEF DESCRIPTION OF THE PRESENT INVENTION

The present invention is capable of measuring color and spectrum energy distribution, based on the formation of an optical image of the object, prior to measurement. This permits application to a wide variety of products, including some of which do not lend themselves to color measurement with conventional means, such as irregularly shaped, non-rigid or fragmented foods or agricultural products.

The present invention utilizes an image method which can provide quantitative visual comparison, as well as automatic continuous comparison.

The above-mentioned objects and advantages of the present invention will be clearly understood when considered in conjunction with the accompanying drawings, in which:

DETAILED DESCRIPTION OF THE INVENTION

Figure 1:
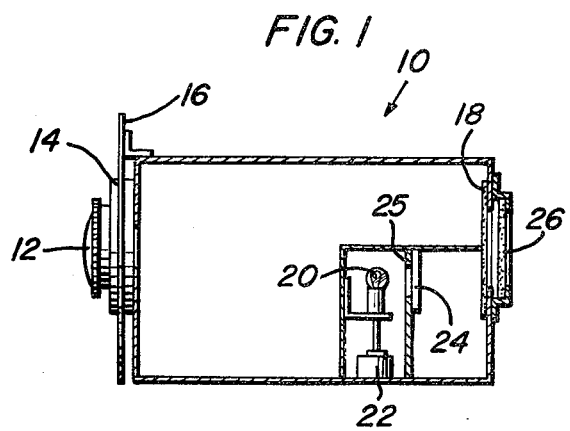
FIG. 1 is a sectional view exposing the internal components of a basic form of the present invention.

Referring to the figures, and more particularly FIG. 1 thereof, a basic form of the present invention is generally denoted by reference numeral 10. The basic configuration is similar to that of a box camera. The objective 12 can be focused on objects at any distance, including infinity — the sky, for example. It is equipped with a precise iris mechanism 14 controlled by a large disc 16 with engraved numbers visible from the back. This regulates the amount of light entering the device.

At the back there is a viewing screen 18 much like that of a reflex camera, but divided in two. The image of the distant object forms on the upper half, while the lower half is evenly illuminated by a small bulb 20 placed behind opal glass 24, energized by a constant voltage mercury cell 22. The opal glass 24 is mounted to a vertical support that has an aperture 25 formed therein to permit the passage of light from the bulb 20 therethrough. Filter 26 can be placed over the entire screen: these can be tristimulus or "separation" filters as used in color photography. Since the viewing of detail is not important, and in the interest of economy, the viewing screen and the filters are rather small.

Operation is simple: after mounting the desired filter (or rotating a filter wheel) the device is focused on an object and the iris (aperture) adjusted so that there is no visible jump of brightness between the two halves of the screen. When tristimulus filters are used, C.I.E. color of distant objects, luminous or reflecting, can be read in this manner. A tripod is generally required.

The illustrated device is small, highly portable and relatively inexpensive. It could be used for visually comparing the color of prints, color lithographs etc., with that of the actual object represented under the same lighting. The device illustrated in FIG. 1 is not, per se, adapted for high precision color measurements. It has been described at this point, chiefly for explaining the basic operation of the invention. However, the described embodiment may be useful in particular application where a visual comparison, by an operator is sufficient.

Figure 2:
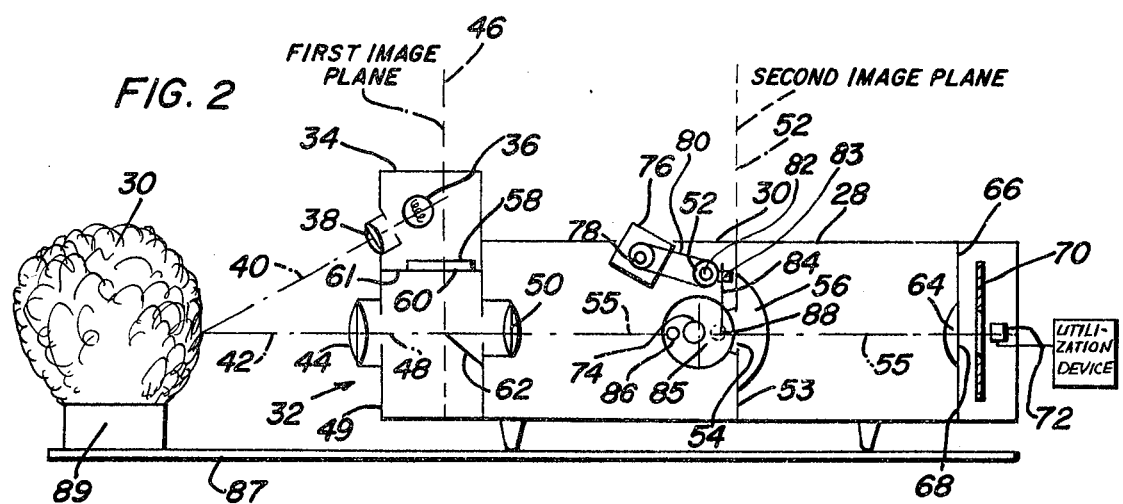
FIG. 2 is a sectional view of a second embodiment of the present invention that is capable of effecting color measurements of large, non-flat objects.

Referring to FIG. 2, a second embodiment of the invention is illustrated. In essence, this figure depicts a selfcalibrating industrial type instrument rather than the more simplified version of FIG. 1 which requires visual comparisons by an operator. The embodiment illustrated in FIG. 2 is particularly adaptable for large objects. The illustrated instrument includes an elongated housing 28 that is positioned to sight a large irregular object 30. The housing has a "front-end" generally indicated by reference numeral 32. This portion includes an upper housing portion 34 with a bulb 36 positioned therein. A condensing lens 38 condenses illuminated light from the lamp 36, toward the object 30, along light path 40. Reflected light from the object is shown along path 42. A first objective lens 44 produces a first image of the object 30 on the first image plane 46. The plane 46 intersects the light path 48, through a lower "front-end" section 49. A second objective 50 is positioned behind, or to the right of the first image plane 46. The objectives 44 and 50 are coaxial. The light path extends, as indicated, from the second objective to a second image plane 52. It is here that a projected image of the object 30 appears. The second image plane 52 is analogous to the viewing screen 18, in the embodiment of FIG. 1. In actuality, the second image plane 52 is manifested by a transverse partition 53 that has an aperture 54 formed therein, with a center that is coaxial with the light path through the housing 28. It is at this aperture, or window, that the second image is formed. As in the case of the first embodiment of FIG. 1, the window 54 is divided into an upper image half and a lower image half, on either side of the path 55. The lower half of the window 54 will occupy the image of object 30. The upper half of the window 54 will occupy the image of a white standard plate 62, located in the "front-end" housing section 49. The standard is oriented at 45° angle, with its raised, left edge contiguous with the first image plane 46. This left edge also intersects the light path 48. Light from the lamp 36 shines through ground glass 58 and an aperture 60 formed in the partition 61. Thereafter, the illuminating light is reflected from a permanent white standard plate 62. The image as reflected from the standard 62 passes through the objective 50 and forms on the upper half of the window 54. A collecting lens 56 collects light from both object and standard images that are delimited by window 54. Thereafter, the collected light continues along path 55 until it passes through intermediate lens 64. The lens is mounted on a transverse partition 66 having an aperture 68 therein which allows the passage of collected light from intermediate lens 64 to a photocell 72, through a selected filter 70. The photocell 72 will receive a "spot" of light that includes intermingled components from the standard image and the object image.

An eccentric shaft 74 is continuously driven by a motor (not shown). The shaft extends across the width of the window 54. The shaft is a separator that periodically increases the area of the top half of window 54 at the expense of the lower half, and then reverses. If light flux is equal in both halves, this does not affect the total light collected at the photocell 72. Otherwise, a fluctuation occurs which results in a variation in the electrical output from the photocell 72. Any fluctuation would be in the nature of a continuous alternating signal. In order to make the signal from the photocell 72 more meaningful for a utilization device, such as a meter, the signal from the photocell must be rectified.

The technique employed is of a conventional nature in colorimeters. Namely, synchronous rectification using a mask or chopper. The chopper takes the form of a disk 85 that is axially mounted to the same motor (not shown) as drives the separator 74. A hole 86 is formed in the disc and a pair of light source-photocell detectors (both not shown) are displaced so that signals from the photocell detectors occur when the hole 86 passes through the position indicated, as well as after being displaced 180° as indicated by 88. As a result, the synchronous rectifier output will generate a gating signal, synchronized to the motion of the separator 74, which may be employed by the illustrated utilization device, in a manner well known in the art. The output from photocell 72 can be calibrated or zeroed by adjusting the movable shutter 84, that is capable of blocking a selected width of the upper half of window 54. One typical mechanism for adjusting the shutter 84 includes an actuator 76 that rotates a miniature reel 78. A belt 80 is entrained between the reel 78 and a displaced second reel 82. The second reel 82 is connected to a lead screw 83 that translate the rotational motion of the reel 82 to rectilinear motion. The shutter 84 is pivotally mounted to the lead screw 83 so that it maintains a vertical blocking position, relative to the window 54. By adjusting the width of the upper half of window 54, the light flux of the image of the standard 62 is effected. It is therefore necessary for the standard to be evenly illuminated, so that the light interception by the shutter 84 is proportional to its displacement. In other words, differences in brightness (light flow per unit area) in the object image are compensated by differences in width of the standard image which has constant brightness except for calibration adjustments.

Brightness of the object image, occupying the lower half of window 54, is not necessarily uniform. Non-flat objects will have variable image brightness, and this is averaged over the width of the window. It is also possible to obtain an averaging effect through defocusing. This feature is important and characteristic of image colorimetry: it permits repeatable measurement of irregular objects of non-uniform color. Other instruments achieve this "averaging" feature through the use of many sensors or large photo-sensitive areas, but this precludes, for practical engineering reasons, the use of automatic self-calibration (dynamic) arrangements. Image colorimeters combine both features.

The object 30 in the configuration of FIG. 2 is placed at a set distance in front of the objective 44 by means of a base 87 on which a jig 89 supports said object in a predetermined position. The larger the distance from object to objective, the less critical this is to the measurement. In practice, no particular accuracy is required when the distance exceed about 6 inches.

Condensing lens 38 concentrates the light from source 36 onto the area of object 30 which is imaged by the objective, or a larger area which includes it. Lens 38 is adjustable for both distance from source 36 and direction, which will depend on object distance. Optimum distance is determined before assembling the invention, depending on the object to be measured. It is affected by gloss, shape of the object, texture etc.

The configuration of FIG. 2 is suitable for large, free-standing objects, such as moldings, plastic cabinets, sheet-metal parts, car or motocycle body parts, and produce such as large fruits and vegetables.

Figure 3:
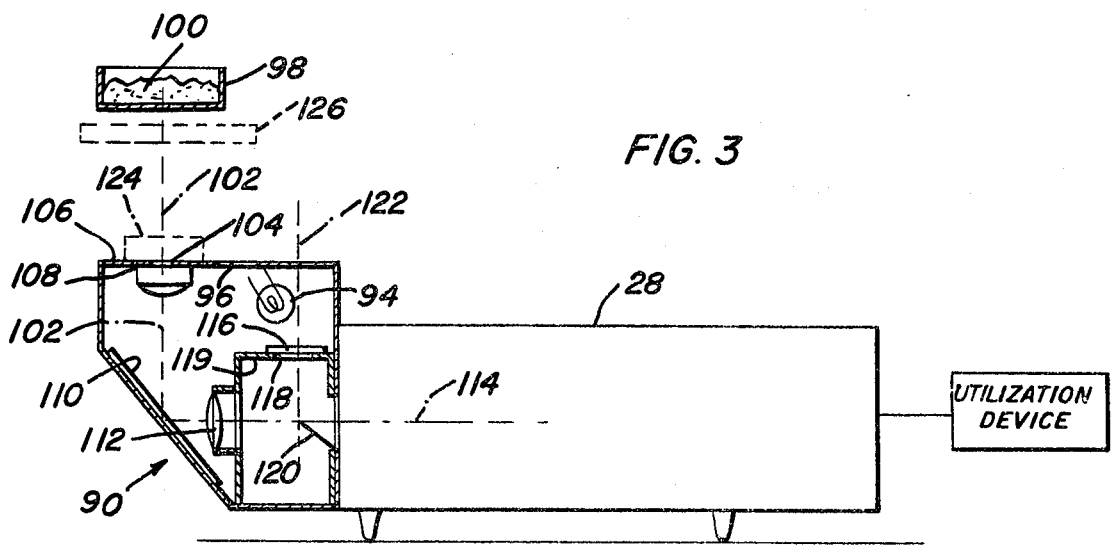
FIG. 3 is a sectional view of a third embodiment of the invention which illustrates the components at the front-end of an instrument adapted to make color measurements of soft or loose materials.

FIG. 3 illustrates a further embodiment of the invention. The illustrated embodiment is particularly adapted for soft or loose materials. A housing 28 is provided which includes the same components as previously described in the housing 28 of FIG. 2. The difference resides in the structure of the "front-end" 90. The "front-end" housing 92 includes a lamp 94 which shines light upwardly through an opening 96 in the upper wall 106 of the "front-end" housing 92. The light passes through a glass container, or plate 98 which contains a soft or loose material 100. Light is then reflected downwardly along path 102 until it passes through the aperture 104, also located in the upper wall 106 of the housing 92. A lens 108 is positioned immediately below the aperture 104 and serves to concentrate light from a larger area of the object 100 for a given distance. The light is then reflected from a mirror 110, situated within the housing 92. The reflection is then directed horizontally, along light path 114, where it is admitted into the housing 28 for further processing as previously explained in connection with FIG. 2. The processed signal can then be fed to a utilization device. The lens 112 is positioned at a point intermediate the mirror 110 and the housing 28.

In order to produce a reference image, the lamp 94 shines downwardly through the frosted glass 116 and further through an aperture 118 that is formed in the partition 119. A permanent white plate 120 is mounted as previously discussed in connection with FIG. 2 to provide the image of a standard. A first image plane exists at 122, at the upper left edge of the plate 120. As in the case of the embodiment discussed in connection with FIG. 2, this image plane occupies the image of the observed object.

A larger area of the material is averaged when the height is greater from the housing 92. There is no condensing lens and therefore no need for other adjustments when the height is changed. The condensing lens 38 of FIG. 2, is needed only when the object is 12 inches or more from the objective.

Among the things that are best measured with the configuration of FIG. 3 include such various materials as sliced fruit and vegetables, grains, preserves, sauces, flour, butter, margarine, cereals, thick soups, meat and meat products.

The configuration as illustrated in FIG. 3 may also be utilized for measuring clear liquids such as soft beverages, beer, etc. By referring to FIG. 3, the container 98 and its contents would be absent. Instead, a clear glass container 124 would be positioned on top of the wall 106 of the "front-end" housing 90. A white tile 126 is positioned approximately where the previous object 100 was located. In operation of this set-up, light from the lamp 94 shines through the aperture 96, formed in the top wall of the housing 92. This light then is reflected from the white tile 126. The reflected light is directed vertically downward along path 102 and intercepts the liquid that is undergoing testing. The liquid is normally poured into a glass container 124. Subsequently, the light is processed as previously described.

Figure 4:
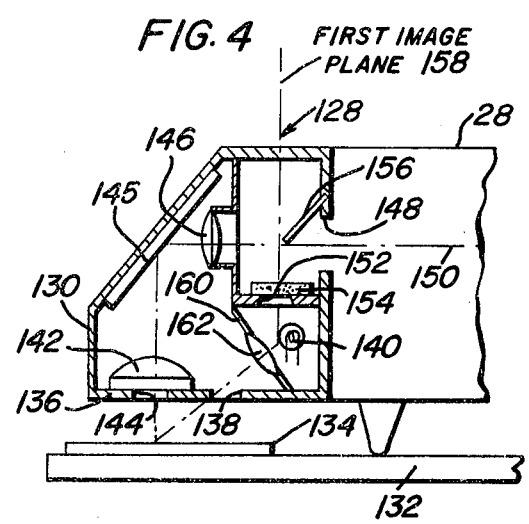
FIG. 4 is a view, similar to FIG. 3, and illustrates an alternate embodiment for the front-end of the instrument, that is capable of making color measurements of printed mattter and small objects.

FIG. 4 illustrates a further embodiment of the present invention that is particularly adapted to make color measurements of details in printed matter and small objects. The configuration shown in the "front-end" of the illustrated device indicates similar components to those in FIG. 3. However, the reflecting mirror has been re-oriented so as to pick up light from objects placed under it rather than above.

In operation of the embodiment illustrated in FIG. 4, the "front-end" is generally indicated by reference numeral 128 which is connected forwardly of the housing 28 that has interior components, as previously described in connection with FIGS. 2 and 3. The "front-end" housing 130 has its lower wall 136 positioned above a bench 132. An object 134 is positioned on the bench 132, the object typically being printed material. An opening 138 is formed in the lower wall 136 to permit the passage of light from lamp 140. The light is reflected by the object 134, and passes through the opening 144. An objective 142 is located over the aperture 144. The light reflected from the object 134 is reflected from mirror 145, after passing through the objective 142. Light reflected from the mirror passes through lens 146 and aperture 148 where it continues as a light path 150 for further processing, as in the previously discussed embodiment. The lamp 140 also shines light through aperture 152 and ground glass 154, covering the aperture. Thereafter, diffused light is reflected from the white permanent standard plate 156 which has its lower, downwardly inclined edge intersecting the first image plane 158. Reflection from the standard plate 156 also continues along the path 150 until an image of the standard plate is formed at the second image plane (not shown), as previously described in connection with the embodiment of FIG. 3.

The objective 142 is short-focus and is placed near the object. There is no contact between the instrument and the object, so that wet proofs can be read if desired. If the instrument simply rests on the table, there is a limitation on sheet size, but this may be removed by suspending the instrument on a traversing runway. A small condensing lens 162 is mounted on a support 160, within the "front-end" housing 130. This lens is utilized to concentrate light on a small area of the sample and to provide sufficient image brightness after enlargement.

A still further embodiment (not shown) may be constructed in a manner resembling the structure of FIG. 2. This embodiment would be utilized for the color testing of luminous objects, for example, fluorescent lights, TV color tubes, etc. In this particular embodiment, the light source would be a low-power bulb energized from a regulated voltage supply, and serving only for standard illumination (since the sample would be luminous). This embodiment must be calibrated by using a sample of known brightness and of sufficient area to fill the window. In practice, calibration is unimportant because color and spectral distribution, not candle power, are of interest. Of course, conventional methods are available for measuring candle power. The embodiment as being described requires a large objective lens when the sample is not very bright, as in the case of TV picture tubes.

The utilization device indicated in the figures may represent a meter for permitting read out of the signal developed by photosensor 72 (FIG. 2). However, instead of a meter, the utilization device may be a recorder or control apparatus on a production line that produces the object being tested.

In order to obtain a fairly complete plot of energy distribution over the visible spectrum, a number of readings are required: currently, abridged spectrophotometers supply a minimum of 8 readings.

A tristimulus colormeter can be converted into an abridged spectrophotometer by adding means for switching a sufficient number of filters in the light beam. This may become a problem if the filters are large or exposed to heat.

Image colorimetry lends itself well to this alteration — the replacement of 3 colorimetric filters with 8 or more narrow-band filters. This is because the light source is external and far from the filters and photosensor, and because the light beam, at the photosensor, has a small cross section.

When color deviation measurements from a standard are desired, an alternate mode of operation may be employed for the various embodiments of the described invention. This alternate mode utilizes fixed "templates" in place of the movable shutter 84 and the shutter adjusting components 76, 78, 80, and 83, all in FIG. 2. The "templates" (not shown) may merely be a shield with an aperture formed therein, of preselected area. Preferably, the aperture area would be adjustable and they are set by zeroing a meter (utilization device) when a "production standard" is positioned in place of a sample. The template would be inserted behind the second image plane (FIG. 2).

A "library" of templates is put together for the entire line of objects to be checked, and for each component of color (X, Y, Z) or for critical points of the spectrum, using the narrow-band filters. In operation, templates are slipped into place, with sample and filter in place (each template is marked for a particular object and filter). The meter will then show a deviation according to the error (color difference between sample and production standard). Permissible deviations can also be marked on the templates, and in this manner the checking of color is simplified to the point that it becomes a "go-no-go" procedure. If color errors are due to a number of possible factors, permissible deviations read with the three tristimulus filters have to be correlated and cannot be considered apart from each other, but more frequently there is a "telltale" wavelength at which deviations are most frequent and severe, and tests can be made with the corresponding narrow-band filter exclusively.

It should be understood that the invention is not limited to the exact details of construction shown and described herein for obvious modifications will occur to persons skilled in the art.

What is claimed is:

1. An image colorimeter comprising:

an enclosure having a light source therein;

a first opening formed in the enclosure for permitting illumination of an exterior object by the source;

a second opening formed in the enclosure for admitting reflected light from the object to be focused on a first image plane defined internally of the enclosure;

a permanent standard device mounted in the enclosure and intersecting the first image plane;

the standard device oriented to reflect light from the source within the enclosure;

a second image plane defined in the enclosure for producing images from reflected light of the object and the standard device;

the second image plane being transverse to the reflected light from the object and the standard device, permitting formation of separate image areas of the object and the standard reference at the second image plane;

means located adjacent the second image plane for alternately varying the size of the image areas;

optical means located at the second image plane for projecting a beam, having components combined from the object and standard device images, along the enclosure; and detecting means located in the enclosure for intercepting the beams and producing an electrical signal, in response thereto which varies in accordance with the respective brightness of the object and standard device images.

2. The subject matter of claim 1 together with an angularly oriented mirror positioned between the second opening in the enclosure and the first image plane for perpendicularly reflecting the light from the object which may be positioned in vertically spaced relation from the second opening.

3. The subject matter of claim 1 wherein the means for alternately varying the size of the image areas comprises an eccentric mounted shaft disposed in spaced relation to the second image plane, rotation of the shaft alternately blocking the passage of light from the object and standard device images to their respective areas at the second reference plane.

4. The structure of claim 3 together with means responsive to rotation of the eccentric shaft for performing synchronous rectification of the electrical signal from the detecting means.

5. The subject matter defined in claim 1 together with shutter means adjustably positioned over one of the image areas for controlling the relative brightness of the images at the second image plane.

6. The structure of claim 5 together with lens means positioned between the second image plane and the detecting means for concentrating the object and standard device images together as a spot on the detecting means.

7. The structure of claim 6 together with light filter means positioned between the lens means and the detecting means for filtering the light from the images in accordance with a predetermined color frequency spectrum.

* * * * *